United States Patent [19]

Misawa

[11] Patent Number: 5,086,313
[45] Date of Patent: Feb. 4, 1992

[54] OPERATION SWITCH UNIT FOR A CAMERA

[75] Inventor: Masayuki Misawa, Tokyo, Japan

[73] Assignee: Asahi Kogaku Kogyo Kabushiki Kaisha, Tokyo, Japan

[21] Appl. No.: 541,474

[22] Filed: Jun. 22, 1990

Related U.S. Application Data

[63] Continuation of Ser. No. 301,124, Jan. 25, 1989, abandoned.

[30] Foreign Application Priority Data

Jan. 28, 1988 [JP] Japan .................. 63-17608

[51] Int. Cl.⁵ .................. G03B 17/38; H01H 3/00; H01H 9/00
[52] U.S. Cl. .................. 200/5 R; 200/18; 354/354
[58] Field of Search .............. 200/5 R, 5 A, 6 R, 6 A, 200/6 B, 6 C, 18, 553, 557, 330, 339; 354/266, 354

[56] References Cited

U.S. PATENT DOCUMENTS

| | | | |
|---|---|---|---|
| 1,426,193 | 8/1922 | Holmgren | 200/6 A |
| 1,825,991 | 10/1931 | Bobroff | 200/6 A |
| 2,686,234 | 8/1954 | Obszarny | 200/6 A |
| 2,808,476 | 10/1957 | Elliott | 200/6 A |
| 2,863,010 | 12/1958 | Riedl | 200/6 A X |
| 3,210,486 | 10/1965 | Holzer | 200/18 |
| 4,040,647 | 8/1977 | F'Geppert | 200/6 A X |
| 4,256,931 | 3/1981 | Palisek | 200/6 A X |
| 4,293,210 | 10/1981 | Kando et al. | 354/266 X |
| 4,324,472 | 4/1982 | Terada et al. | 354/266 |
| 4,329,039 | 5/1982 | Kaneko | 354/266 |
| 4,349,708 | 9/1982 | Asher | 200/6 A |
| 4,456,357 | 6/1984 | Sunouchi et al. | 354/266 |
| 4,486,629 | 12/1984 | Sledesky | 200/6 A |
| 4,511,769 | 4/1985 | Sahakian et al. | 200/6 A |
| 4,520,240 | 5/1985 | Swindler | 200/18 X |
| 4,614,847 | 9/1986 | Sa Sao | 200/6 A |

Primary Examiner—J. R. Scott
Attorney, Agent, or Firm—Sandler, Greenblum & Bernstein

[57] ABSTRACT

An operation switch unit for actuating more than two switches comprising a substrate on which the switches are located on apexes of an imaginary polygon, the number of sides of the polygon corresponding to number of switches, and a single operating member which can swing about fulcra which are provided above intermediate portions of the apexes of the imaginary polygon to selectively actuate the switches in accordance with the swing movement of the operating member.

23 Claims, 4 Drawing Sheets

OPERATION SWITCH UNIT FOR A CAMERA

This application is a continuation of application No. 07/301,124, filed Jan. 25, 1989, now abandoned.

BACKGROUND OF THE INVENTION

1. Field of the Invention

The present invention relates to an operation switch unit for selectively operating more than two switches and, more precisely, it relates to an operation switch unit for an electrically driven zoom lens camera in which the zooming operation can be effected by a zoom motor.

2. Description of Related Art

There are known lens shutter type of cameras or single-lens reflex cameras in which the zooming operation can be effected by a zoom motor. In such an electrically driven zoom lens camera, momentary type or push button type zoom switches for forward and reverse rotation of the zoom motor are provided. In a conventional electrically driven zoom lens camera, the zoom switches are functionally and operationally independent from an electromagnetic shutter release switch which is usually provided in the camera. Usually, the zoom switches and the release switch are provided on an upper right portion of a rear surface and on a right end portion of an upper surface of the camera body, as viewed from the rear, respectively, for convenience of a photographer to operate the switches with his or her thumb and forefinger. However, it is particularly difficult for a photographer to operate the zoom switches provided on the upper right portion of the rear surface of the camera body while looking at an object to be photographed through a finder, since his or her forehead interferes with the zoom switches. To prevent this interference, it is necessary to provide the finder as far left as possible when viewed from the rear, resulting in limited freedom of design of the camera. This is a serious problem, particularly with a compact and small camera.

SUMMARY OF THE INVENTION

Contrary to the conventional philosophy of separate operations of the zoom switches and the release switch in an electrically driven zoom lens camera, this present invention is directed to a single common actuator for the zoom switches and the release switch.

The primary object of the present invention is to provide an operation switch unit having a single common actuator which can effectively operate both the zoom switches and the release switch.

It is noted that an operation switch unit according to the present invention is not limited to one for an electrically driven zoom lens camera and can be widely used as an actuator of any kind of switches. Another object of the present invention is to provide an operation switch unit having a single actuator which can effectively operate more than two switches.

To achieve the primary object mentioned above, according to an aspect of the present invention, there is provided an operation switch unit for a zoom lens camera which is driven by a zoom motor and which has zoom switches for forward and release rotation of the zoom motor and an electromagnetic reverse switch, and said zoom switches and said release switch having respective electrical contacts, the improvement comprising a substrate on which the electrical contacts of the zoom switches and the release switch are located on three apexes of an imaginary triangle, and a single operating member which can swing about three fulcra which are provided above intermediate points of respective sides of the imaginary triangle to selectively push the three electrical contacts to establish an electrical connection in accordance with directions of the swinging movement of the single operating member.

It is also possible to provide the three fulcra on a fulcrum plate separate from the substrate. The fulcrum plate has openings through which pushing legs provided on the operating member to correspond to the three electrical contacts extend. The fulcrum plate can be connected to the operating member by a spring which biases the operating member to come close to the fulcrum plate at a center portion of the imaginary triangle.

According to another aspect of the present invention, there is provided an operation switch unit for more than two switches, comprising a substrate on which the switches are located on three apexes of an imaginary triangle, and a single operating member which can swing about three fulcra which are provided on intermediate points of respective sides of the imaginary triangle to selectively actuate the switches in accordance with directions of swinging movement of the single operating member.

BRIEF DESCRIPTION OF DRAWINGS

The invention will be described below in detail with reference to the accompanying drawings showing embodiments of the invention, in which.

DETAILED DESCRIPTION OF EMBODIMENTS

Figure 5:
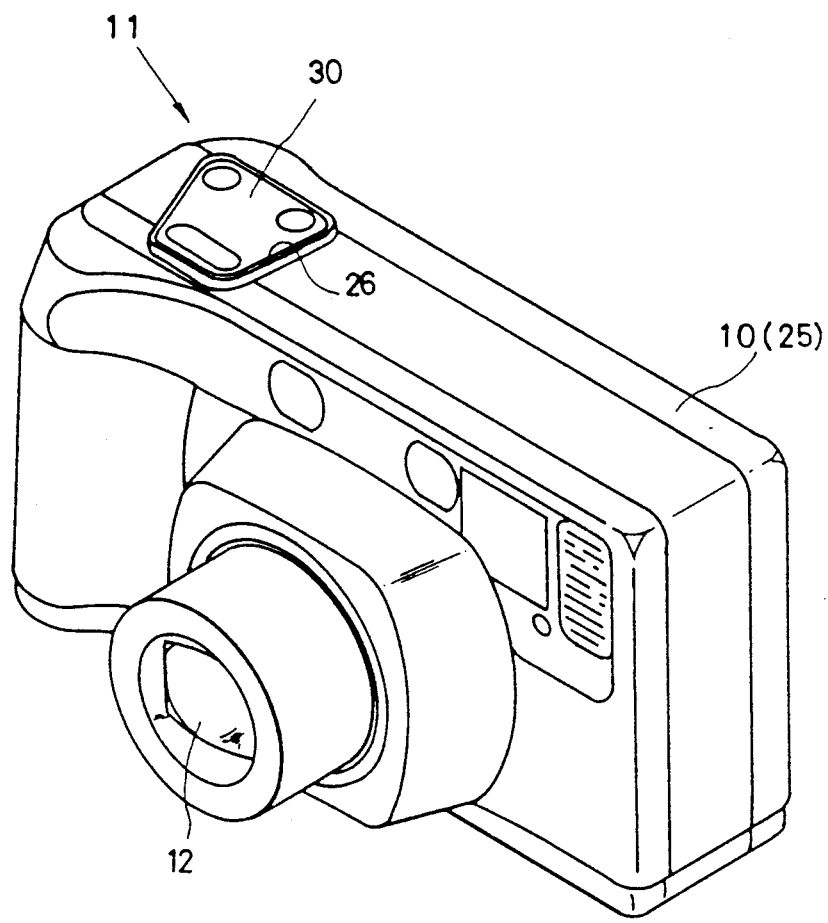
Fig. 5 is a perspective view of a camera having an operation switch unit according to the present invention.

FIG. 5 shows a zoom lens camera having a camera body 10 on which an operation switch unit 11 is provided, according to an embodiment of the present invention. The operation switch unit 11 is located at a position of the camera body in which a conventional release switch was usually provided, i.e., at a left end portion of an upper surface of the camera body 10, when viewed from the front. The illustrated operation switch unit 11 is slightly larger than a conventional release switch, since the operation switch unit 11 has therein a release switch and zoom switches, as will be discussed below. Accordingly, in the present invention, no zoom switch is provided on the rear surface of the camera body, unlike a conventional zoom lens camera. A variable power lens group of a zoom lens system 12 moves forward and backward in an optical axis direction of the camera in accordance with the forward rotation and the reverse rotation of the zoom motor (not shown) to effect the zooming operation. Since the subject of the present invention is not directly addressed to the above-mentioned zoom lens system 12 which is per se known, no detailed explanation therefor is given herein.

Figure 1:
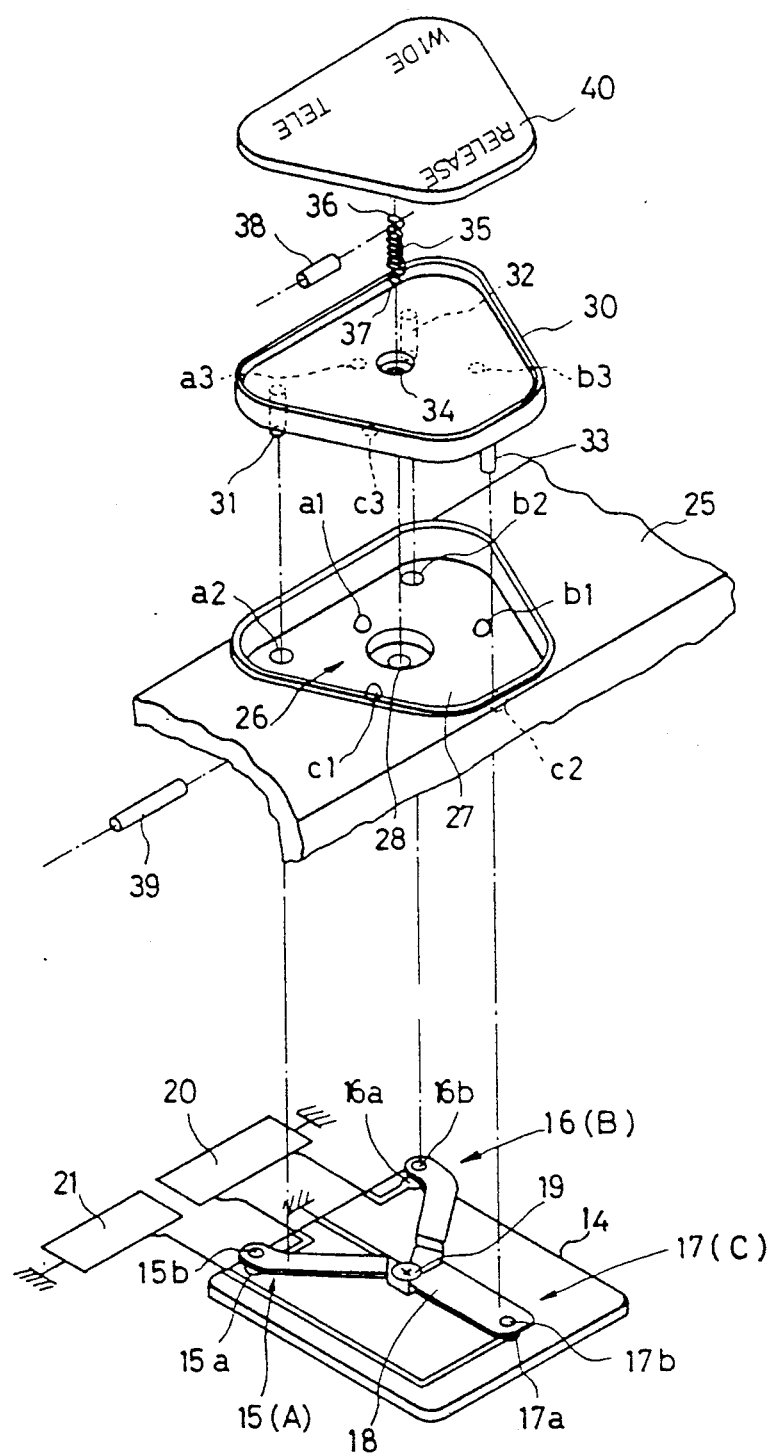
FIG. 1 an exploded perspective view of an operation switch unit for an electrically driven zoom lens camera according to an embodiment of the present invention.
Figure 2:
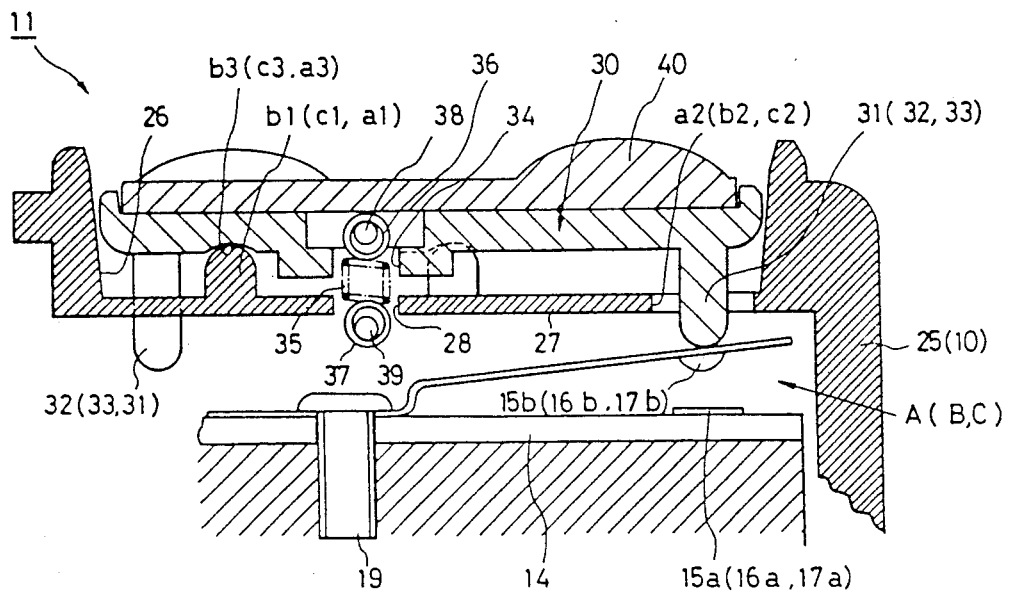
FIG. 2 is a sectional view of an assembly of the operation switch unit shown in FIG. 1.
Figure 3:
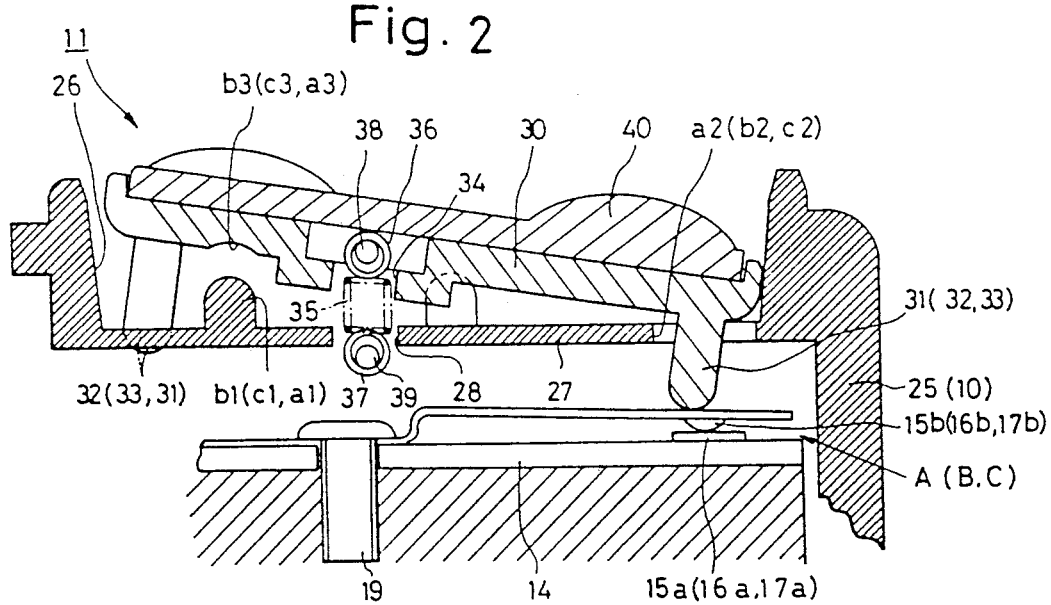
FIG. 3 a sectional view similar to FIG. 2, shown in a different operational position.

FIGS. 1-3 show an operation switch unit 11 by way of an example. Normally open electrical contacts 15, 16 and 17 of a zoom switch A for the forward rotation of the zoom motor, a zoom switch B for the reverse rotation of the zoom motor, and an electromagnetic release switch C are provided on a substrate 14 provided in the camera body 10, respectively. The contacts 15, 16 and 17 have stationary contact elements 15a, 16a and 17a secured to the substrate 14, and movable elastic contact elements 15b, 16b and 17b, respectively. The elastic contact elements 15b, 16b and 17b are normally spaced from the associated stationary contact elements 15a, 16a and 17a by their elasticity. The movable contact elements 15b, 16b and 17b form a single contact member 18 consisting of a generally Y-shaped leaf spring. The contact member 18 is secured at its center portion to the substrate 14 by a set screw 19, so that the elastic contact elements 15b, 16b and 17b are provided on the free ends of the three elastically deformable leg portions of "Y". The contact member 18 is grounded at the center portion by the set screw 19. The stationary contact elements 15a and 16a are connected to a zoom motor control circuit 20, and the stationary contact element 17a is connected to an electromagnetic release control circuit 21.

The normally open contacts 15, 16 and 17 are located on three apexes of an imaginary triangle, so that the contact 15 of the zoom switch A for forward rotation and the contact 16 of the zoom switch B for the reverse rotation are located along a line extending in the lateral direction of the camera when viewed from front, and the contact 17 of the electromagnetic release switch C is located in front of the contacts 15 and 16.

Above the substrate 14 is located an upper decoration plate 25 which is provided therein with a recess 26 for receiving an operation member 30. The bottom of the recess 26 constitutes a fulcrum plate 27 which is provided with three fulcra a1, b1 and c1 between the normally open contacts 15 and 16, between the normally open contacts 16 and 17, and between the normally open contacts 17 and 15 (i.e., on the intermediate points of the three sides of the imaginary triangle) above the contacts, respectively. Furthermore, the fulcrum plate 27 has openings a2, b2 and c2 through which three pushing leg portions 31, 32 and 33 of the operating member 30 extend that are above the corresponding contacts 15, 16 and 17. A spring insertion hole 28 is formed in the fulcrum plate 27 the center of a triangle defined by the three openings a2, and c2.

The operating member 30 which is generally triangular has the above-mentioned pushing leg portions 31, 32 and 33 at the apexes thereof. The pushing leg portions 31, 32 and through the corresponding openings a2, b2 and c2 which are opposed to the corresponding contacts 15, 16 and 17 The operating member 30 has three recesses a3, b3 and c3 in which the corresponding fulcra a1, b1 and c1 are engaged. A spring insertion hole 34 is formed at the center of the operating member 30.

A tension spring 35 is inserted in the spring insertion holes 34 and 28 of the operating member 30 and the fulcrum plate 27. The spring 35 has at its opposite ends hooks 36 and 37 in which cross pins 38 and 39 are inserted to prevent the spring 35 from coming out of the spring insertion holes 34 and 28, so that the operating member 30 is biased toward the fulcrum plate 27 at the center portion of the operating member 30. Numeral 40 designates a decoration plate of the operating member 30.

When the three apex portions of the operating member 30 are selectively pushed down, the zoom switch A for the forward rotation of the zoom motor, the zoom switch B for the reverse rotation of the zoom motor, and the electromagnetic release switch C can be selectively actuated (closed) to bring the movable contact elements 15b, 16b and 17b into contact with the corresponding stationary contact elements 15a, 16a and 17a. Namely, when the apex portion of the triangular operating member 30 that is located on the right rear end thereof, as viewed from rear is pushed down, the operating member 30 swings (rotates) about the fulcra a1 and c1, so that the pushing leg portion 31 pushes the movable contact element 15b to elastically deform the same. As a result, the elastically deformable contact element 15b is brought into contact with the corresponding stationary contact 15a. Consequently, the zoom motor is rotated in the forward direction through the zoom motor control circuit 20 to move the zoom lens system 12, for example, toward a longer focal length position.

On the contrary, when the apex portion of the triangular operating member 30 that is located on the left rear end thereof as viewed from rear is pushed down, the operating member 30 swings (rotates) about the fulcra a1 and b1, so that the pushing leg portion 32 pushes the contact element 16b to elastically deform the same, thereby to bring the movable contact element 16b into contact with the corresponding stationary contact element 16a. As a result, the zoom motor is reversed through the zoom motor control circuit 20 to move the zoom lens system 12, for example, toward a shorter focal length position.

After the focal length (composition) is determined by the above-mentioned operations of the contact 15 and/or the contact 16, a photographer moves his or her finger (e.g. forefinger) to the front portion (front apex portion) of the operating member 30 to push the same down at an optimum shutter chance. As a result, the operating member 30 swings (rotates) about the fulcra b1 and c1, so that the pushing leg portion 33 pushes the elastic contact element 17b to elastically deform the same, thereby to bring the elastic contact element 17b into contact with the corresponding stationary contact 17a. Consequently, the shutter is released through the electromagnetic release control circuit 21.

In the operations mentioned above, the tension spring 35 is tensed to have a tensile force, as can be seen in FIG. 3. Accordingly, when the operational force is released, the operating member 30 is returned to an inoperative position shown in FIG. 2, in which the recesses a3, b3 and c3 are equally engaged with the associated fulcra a1, b1 and c1, by the tensile force.

In the above-mentioned embodiment, the operation switch unit is applied to an electrically driven zoom lens camera. The present invention can be generally used to operate any kind of switches. Namely, according to the present invention, more than two switches can be selectively actuated by a single common operating member.

A part or all of the switches can be normally closed switches. In this alternative, the pushing leg portions 31, 32 and 33 open the associated normally closed contacts.

In case of more than three switches, the operating member is in the form of a polygon having apexes, the number of sides of which corresponds to the number of the associated switches. The electrical contacts are located below the apexes of the operating member. The number of fulcra which are located at the intermediate portions of the sides of the polygon corresponds to the number of the electrical contacts.

Figure 4:
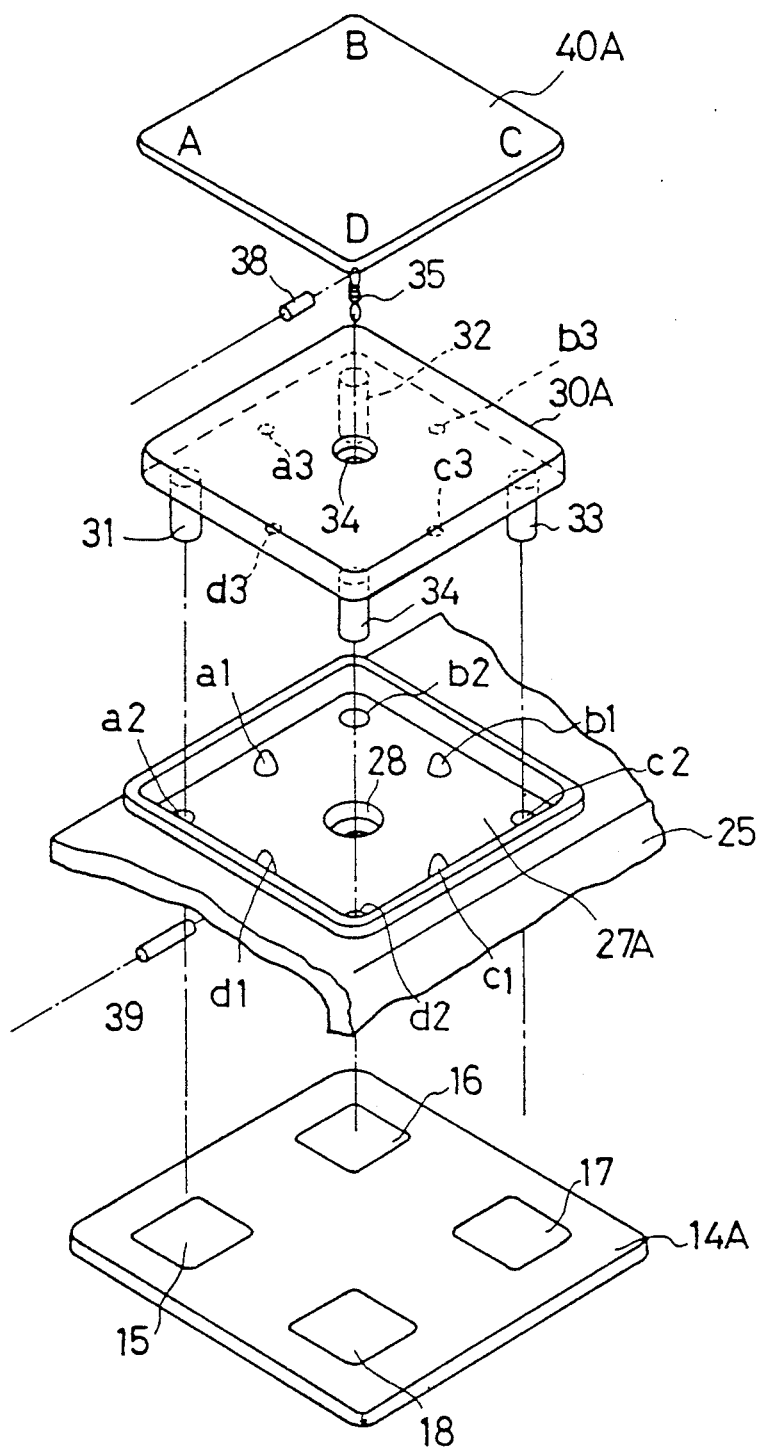
FIG. 4 is an exploded perspective view of an operation switch unit, similar to FIG. 1, but according to a different embodiment of the present invention.

FIG. 4 shows another embodiment of the present invention, directed to four switches (contacts). The operating member 30A, which has a generally square configuration has pushing leg portions 31, 32, 33 and 34 integral therewith located on the lower surface of the operating member 30A below the associated apexes of the square. The operating member 30A has four recesses a3, b3, c3 and d3 in which the fulcra a1, b1, c1 and d1 are engaged, at the intermediate portions of the leg portions 31, 32, 33 and 34. The fulcrum plate 27A has four openings a2, b2, c2 and d2 through which the corresponding pushing leg portions 31, 32, 33 and 34 extend and the four fulcra a1, b1, c1 and d1, as mentioned above. The substrate 14A has thereon four switches 15, 16, 17 and 18 which are pushed down by the corresponding pushing leg portions 31, 32, 33 and 34. Other constructions of the modified embodiment shown in FIG. 4 are the same as that of the above-mentioned first embodiment. The components in the modified embodiment shown in FIG. 4 are designated with the same reference numerals as those in the first embodiment.

In FIG. 4, when the apex portion A of a decoration plate 40A which is integral with the operating member 30A is pushed down, the operating member 30A swings (rotates) about the fulcra a1 and d1, so that the pushing leg portion 31 pushes the switch 15. Similarly, when the apex portions B, C and D of the decoration plate 40A are pushed down, the operating member 30A swings about the fulcra a1 and b1, b1 and c1, and c1 and d1, respectively. As a result, the pushing leg portions 32, 33 and 34 push the associated switches 16, 17 and 18, respectively. Thus, the switches 15, 16, 17 and 18 can be selectively closed or opened.

The second embodiment shown in FIG. 4 can be also advantageously applied to a zoom lens camera having a photographing mode selection switch or photographing mode selection switches (e.g. a manual photographing mode and an automatic photographing mode) and/or a shutter mode selection switch or shutter mode selection switches (e.g. continuous photographing and single photographing), in addition to the above-mentioned zoom switches for the zoom motor and the release switch. Namely, according to the second embodiment illustrated in FIG. 4, the four switches [two zoom switches, release switch, photographing mode selection switch(es) and/or shutter mode selection switch(es),]- can be selectively actuated by the single operating member 30A.

As can be understood from the foregoing, according to the present invention, particularly when the operating switch unit is applied to an electrically driven zoom lens camera, both the zooming operation (focus adjustment) and the shutter release can be easily effected only by actuating the single operating member. It should be also appreciated that according to the present invention, no zoom switch is provided on the rear surface of the camera body. In particular, when the two zoom switches are located on the right and left end portions of the operating member, and the electromagnetic release switch is located on the front portion thereof, as viewed from from the front, the feeling or operation is natural to the photographer.

The number of switches which can be actuated by the single operating member in the present invention is not limited to three or four. Namely, more than three switches can be similarly actuated by the single operating member.

I claim:

1. An operation switch unit for actuating more than two switches located at the apexes of an imaginary polygon, each said switch comprising at least one actuatable member, the number of sides of the polygon corresponding to the number of the switches, and a single operating member moveably positioned and having a plurality of actuating portions, said operating member being pivotable about discrete fulcra positioned intermediate the apexes of the imaginary polygon and spaced from the center of the imaginary polygon to bring a selected one of said actuating portions into contact with a said actuable member of one of said switches.

2. An operation switch unit according to claim 1, further comprising a fulcrum plate, said fulcra being provided on said fulcrum plate.

3. An operation switch unit according to claim 2, wherein said actuating portions comprise pushing leg portions, the number of said leg portions corresponding to the number of the switches, for actuating the corresponding switches.

4. An operation switch unit according to claim 3, wherein said fulcrum plate has openings through which said corresponding pushing leg portions extend so as to come into contact with said corresponding switches.

5. An operating switch unit according to claim 4, further comprising a spring for connecting and biasing said operating member and said fulcrum plate to come close to each other at a center of the imaginary polygon.

6. An operation switch unit according to claim 3, wherein said switches comprise normally open electrical contacts, each said switch having a stationary contact element and a movable contact element which can be actuated by an said corresponding pushing leg portion.

7. An operation switch unit according to claim 6, wherein said movable contact elements are elastically deformable, so that when said movable contact elements are actuated by said corresponding pushing leg portions, said movable contact elements can be brought into contact with said corresponding stationary contact elements.

8. An operation switch unit according claim 7, wherein said movable contact elements are formed by leg portions for a single elastically deformable leaf spring which is secured to said fulcrum plate at the center of said fulcrum plate.

9. An operation switch unit according to claim 1, wherein the number of switches is three and said imaginary polygon is an imaginary triangle.

10. An operation switch unit according to claim 1, wherein said number of switches is four and the imaginary polygon is an imaginary square.

11. An operation switch unit in accordance with claim 1, wherein said operation unit comprises means for operating an electrically drive zoom lens camera including a zoom lens system, a zoom lens motor, two switches for controlling said zoom lens motor and a further electromagnetic release switch, said two zoom switches and said release switch comprising said more than two switches.

12. An operation switch unit according to claim 1 and further comprising a plate on which said switches are located, said single operating member positioned above said plate.

13. The operating switch unit according to claim 1, said actuating portions and said actuating members comprising means enabling contact to occur in one of said switches independently of the other said switches.

14. The operation switch unit of claim 1, further comprising means for selecting any one of said switches for actuation.

15. A multiple switch operating apparatus comprising a plurality of switches, each said switch comprising at least one actuating member, a single operating member, means for pivotably mounting said operating member above said switches, a plurality of discrete fulcra between said operating member and said switches, said fulcra defining a plurality of discrete pivot axes, and said operating member comprising means for selectively pivoting about a selected axis to acutate a selected one of said switches, each said axis being defined by a plurality of said fulcra.

16. A multiple switch operating apparatus according to claim 15, wherein said multiple switch operating apparatus is provided in a zoom lens camera which is driven by a zoom motor provided in a camera body, and which has zoom switches for forward and reverse rotation of said zoom motor and an electromagnetic release switch, said zoom switches and said release switch comprising said plurality of switches.

17. A multiple switch operating apparatus according to claim 16 wherein said zoom switches are located on opposite lateral sides of said operating member and said electromagnetic release switch is located on a front portion of said operating member with respect to the camera body in which the multiple switch operating apparatus is provided.

18. The multiple switch operating apparatus according to claim 16, wherein said switch unit is located on an upper surface of a camera body.

19. The multiple switch operating apparatus according to claim 16, further comprising an upper decorative plate secured to said camera body, said plate including a recess comprising means for receiving said operating member.

20. The multiple switch operating apparatus according to claim 19, wherein said recess includes a bottom comprising a full fulcrum plate on which said zoom switches and said electromagnetic release switch are mounted.

21. The multiple switch operating apparatus according to claim 15, and further comprising a plate on which a plurality of switches are mounted, said operating member pivotally mounted above said plate.

22. The multiple switch operating apparatus according to claim 15, said actuating members and said operating member comprising means for enabling one switch to be actuated independently of said other switches.

23. The multiple switch operating apparatus according to claim 15, further comprising means selecting any one of said plurality of switches for actuation.

* * * * *

UNITED STATES PATENT AND TRADEMARK OFFICE
CERTIFICATE OF CORRECTION

PATENT NO. : 5,086,313
DATED : February 4, 1992
INVENTOR(S) : Masayuki MISAWA

It is certified that error appears in the above-indentified patent and that said Letters Patent is hereby corrected as shown below:

On the cover page item [56], U.S. Patent Documents, on line 19, change "Sa Sao" to ---Sasao---.

At column 6, line 12 (claim 1, line 6), change "moveably" to ---movably---.

At column 6, line 40 (claim 6, line 5), after "by" insert ---an---.

At column 6, line 52 (claim 8, line 3), change "for" to ---of---.

Signed and Sealed this

Thirty-first Day of October 1995

Attest:

BRUCE LEHMAN

*Attesting Officer*   *Commissioner of Patents and Trademarks*